United States Patent
Tsai et al.

(10) Patent No.: US 8,570,900 B2
(45) Date of Patent: Oct. 29, 2013

(54) ANTENNA SYSTEM AND WIRELESS COMMUNICATION DEVICE EMPLOYING THE SAME

(75) Inventors: Tsung-Chi Tsai, New Taipei (TW); Szu-Tso Lin, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 275 days.

(21) Appl. No.: 13/084,658

(22) Filed: Apr. 12, 2011

(65) Prior Publication Data

US 2012/0163364 A1    Jun. 28, 2012

(30) Foreign Application Priority Data

Dec. 23, 2010  (TW) ................................ 99145485 A

(51) Int. Cl.
*H04L 12/28* (2006.01)

(52) U.S. Cl.
USPC ......................................... 370/254; 370/465

(58) Field of Classification Search
None
See application file for complete search history.

(56) References Cited

U.S. PATENT DOCUMENTS

| 6,313,669 | B1 * | 11/2001 | Suenaga ................. 327/108 |
| 7,515,555 | B2 * | 4/2009 | Ishidoshiro .............. 370/310 |
| 7,970,016 | B2 * | 6/2011 | Deng et al. ............... 370/480 |
| 8,330,590 | B2 * | 12/2012 | Poupyrev et al. ......... 340/407.2 |
| 2006/0045220 | A1 * | 3/2006 | Biswas et al. ............ 375/347 |
| 2009/0059842 | A1 * | 3/2009 | Maltseff et al. ........... 370/328 |
| 2011/0014958 | A1 * | 1/2011 | Black et al. .............. 455/575.7 |
| 2011/0304512 | A1 * | 12/2011 | Friederich et al. ........ 343/702 |
| 2012/0062424 | A1 * | 3/2012 | Hwang .................... 342/374 |

* cited by examiner

*Primary Examiner* — Gregory Sefcheck
*Assistant Examiner* — Daniel Mitchell
(74) *Attorney, Agent, or Firm* — Altis & Wispro Law Group, Inc.

(57) ABSTRACT

An antenna system in a wireless communication device includes a first antenna, a second antenna, a baseband microchip, a signal sensing unit, a logical circuit, and a switch unit. The first antenna receives and transmits wireless signals; the second antenna transmits wireless signals. The baseband microchip processes the wireless signals and provides a voltage logic signal. The logical circuit logically processes the voltage logic signal and the command signal to generate different switch signals, and the switch unit is controlled by the switch signals from the logical circuit to connect to the first antenna or to the second antenna to transmit the wireless signals.

18 Claims, 2 Drawing Sheets

ANTENNA SYSTEM AND WIRELESS COMMUNICATION DEVICE EMPLOYING THE SAME

BACKGROUND

1. Technical Field

The disclosure generally relates to signal transmission, particularly to an antenna system used in a wireless communication device.

2. Description of the Related Art

With wireless communication devices such as mobile phones, it is desirable to keep as low as possible the dose of electromagnetic radiation imposed on the body tissue of a user. The rate at which energy is absorbed by the body when exposed to a radio frequency (RF) electromagnetic field is measured by specific absorption rate (SAR).

As a result, it is necessary to improve antenna design to reduce the SAR value of antennas without compromising the communication quality of the wireless communication device.

Therefore, there is room for improvement within the art.

BRIEF DESCRIPTION OF THE DRAWINGS

Many aspects of an exemplary antenna system and wireless communication device employing the same can be better understood with reference to the following drawings. The components in the drawings are not necessarily drawn to scale, the emphasis instead being placed upon clearly illustrating the principles of the exemplary antenna system and wireless communication device employing the same. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
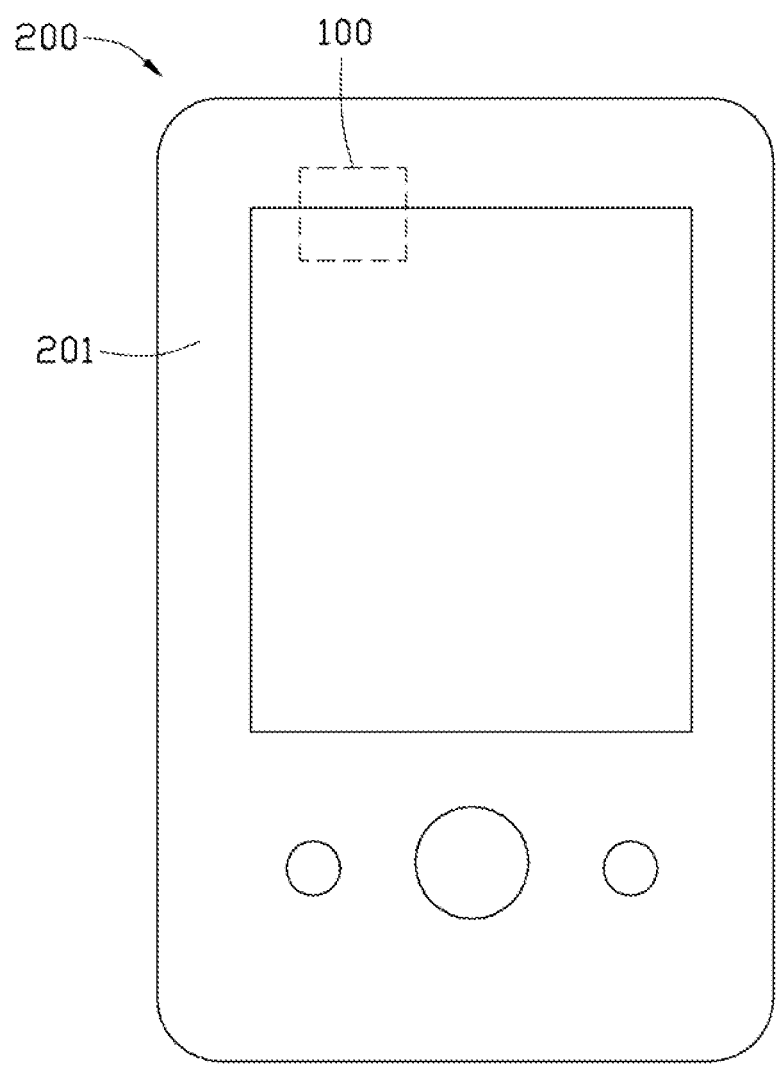
FIG. 1 is a schematic view of a wireless communication device including an antenna system, according to an exemplary embodiment of the disclosure.

FIG. 1 shows a wireless communication device 200 including an antenna system 100, according to an exemplary embodiment of the disclosure. The wireless communication device 200 can be a mobile phone and includes a main body 201, and the antenna system 100 is positioned within the main body 201. In this exemplary embodiment, the antenna system 100 can work in either of two communication modes, such as global system for mobile communications (GSM) mode and wideband code division multiple access (WCDMA) mode.

Figure 2:
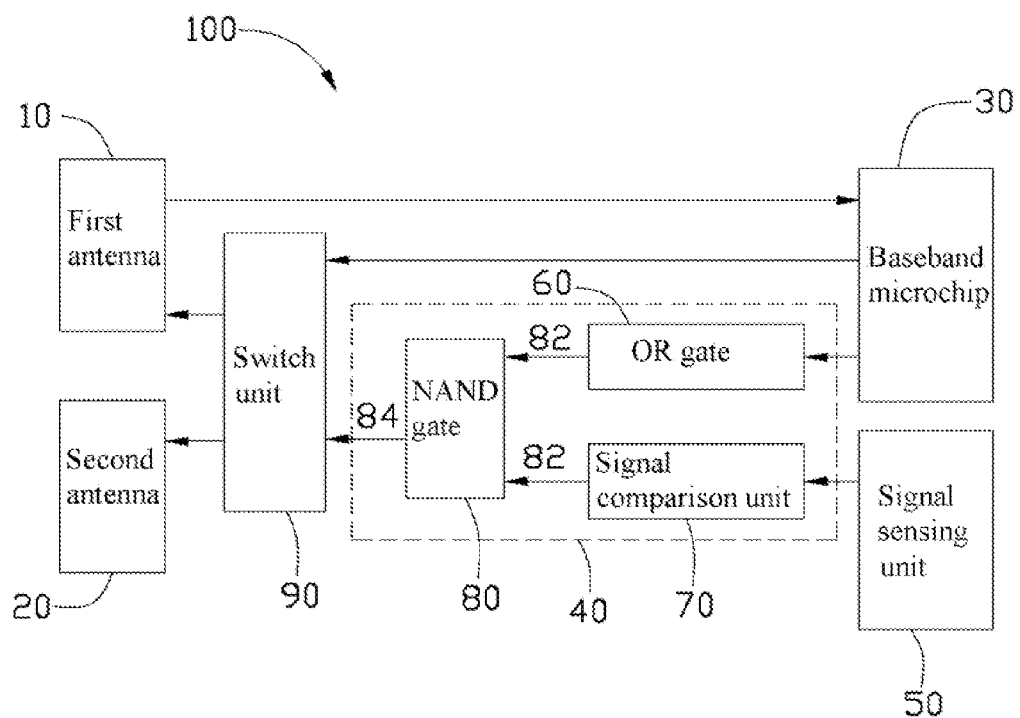
FIG. 2 is a block view of the antenna system shown in FIG. 1.

Also referring to FIG. 2, the antenna system 100 includes a first antenna 10, a second antenna 20, a baseband microchip 30, a signal sensing unit 50, a logical circuit 40, and a switch unit 90. The logical circuit 40 includes an OR gate 60, a signal comparison unit 70, and a NAND gate 80.

The first antenna 10 is capable of receiving and transmitting wireless signals, such as GSM signals or WCDMA signals. The second antenna 20 is capable of transmitting the GSM signals or the WCDMA signals. The SAR value of the first antenna 10 is greater than that of the second antenna 20 when the first antenna 10 and the second antenna 20 transmit wireless signals, due to the differences of structures and installation positions between the first antenna 10 and the second antenna 20. In this exemplary embodiment, the first antenna 10 is located adjacent to the signal sensing unit 50.

The baseband microchip 30 is electrically connected to the first antenna 10 and the switch unit 90, and is capable of converting (e.g., decoding) the wireless signals received from the first antenna 10 into corresponding audio signals. The baseband microchip 30 is further capable of converting (e.g., encoding) the audio signals into corresponding wireless signals, and selectively transmitting the converted wireless signals to the first antenna 10 or the second antenna 20 through the switch unit 90.

Additionally, the baseband microchip 30 is electrically connected to the OR gate 60. Thus, when the wireless communication device 200 provides and transmits the WCDMA or GSM signals, the baseband microchip 30 provides and triggers a high voltage logic signal (e.g., logical 1).

The signal sensing unit 50 can be a capacitive type transducer, and is electrically connected to the signal comparison unit 70. The signal sensing unit 50 is for detecting and measuring any user-induced pressure. For example, when the user holds the wireless communication device 200, the signal sensing unit 50 senses the user-induced pressure, and then causes capacitance changes therein to generate a corresponding command signal.

The signal comparison unit 70 prestores a predetermined operating frequency of GSM mode and WCDMA mode, such as GSM1900 or CDMA2000, which have a wide range of SAR values. The signal comparison unit 70 compares the predetermined operating frequency with a current operating frequency, and generates an electrical signal. The two frequencies may be different for any number of known reasons, such as power fluctuations or interference. In this exemplary embodiment, when user holds or nears the wireless communication device 200, the signal sensing unit 50 generates and outputs the command signal to the signal comparison unit 70 due to changes in capacitance. The signal comparison unit 70 is activated by the command signal from the signal sensing unit 50, and compares the current operating frequency with the predetermined operating frequency of the wireless communication device 200 to generate an electrical signal.

In detail, when the current operating frequency is substantially equal to the predetermined operating frequency of the wireless communication device 200, the signal comparison unit 70 generates a high voltage logic signal, such as logical 1. When the current operating frequency is unequal to the predetermined operating frequency, the signal comparison unit 70 generates and outputs a low voltage logic signal, such as logical 0.

The NAND gate 80 includes two inputs 82 and an output 84. The two inputs 82 of the NAND gate 80 are electrically connected to the signal comparison unit 70 and the OR gate 60 respectively. The output 84 is electrically connected to the switch unit 90. The OR gate 60 is a digital logic gate that implements logical disjunction, and a high output (e.g., logical 1) results if one or both the input signals to the OR gate 60 are high. On the contrary, the NAND gate 80 behaves in a manner that is the opposite of the AND gate, such that a low output (e.g., logical 0) results only if both the input signals to the NAND gate 80 are high. In this exemplary embodiment, the inputs 82 of the NAND gate 80 receive electrical signals from both the OR gate 60 and the signal comparison unit 70, and the output 84 outputs a corresponding switch signal to the switch unit 90.

The switch unit 90 can be an analog switch, controlled by the switch signal from the output 84 of the NAND gate 80 to connect to the first antenna 10 or to the second antenna 20. In this exemplary embodiment, when the switch signal from the output 84 is high, such as logical 1, the switch unit 90 is will electrically connect to the antenna 10. When the switch signal from the output 84 is low, such as logical 0, the switch unit 90 is will electrically connect to the second antenna 20.

Further referring to FIGS. 1 and 2, when the signal sensing unit 50 fails to detect any user-induced pressure, and the wireless communication device 200 works at any frequency band of GSM mode or WCDMA mode, the signal comparison unit 70 outputs a low voltage logic signal (0) to one of the inputs 82, the baseband microchip 30 triggers and outputs a high voltage logic signal (1) to the other input 82. Thus, the output 84 of the OR gate 80 outputs a high switch signal (1) to control the switch unit 90 to connect the first antenna 10, forming a first transmission path, and the first antenna 10 receives and transmits wireless signals along the first transmission path. In such case, since the user lacks physical contact with the wireless communication device 200 (i.e., using a headset or bluetooth), the user is not fully exposed to the RF electromagnetic field.

When the signal sensing unit 50 does detects any user-induced pressure, and the wireless communication device 200 works at any non-predetermined operating frequencies (e.g., adjacent to the predetermined operating frequencies or out of the predetermined operating frequencies) of GSM mode or WCDMA mode, the baseband microchip 30 outputs a high voltage logic signal (1) to one of the inputs 82, the signal comparison unit 70 compares the predetermined operating frequency with the current operating frequency and outputs a low voltage logic signal (0) to the other input 82. Thus, the output 84 of the OR gate 80 outputs a high switch signal (1) that controls the switch unit 90 to connect the first antenna 10, and the first antenna 10 receives and transmits wireless signals along the first transmission path. In such case, the wireless communication device 200 works at the non-predetermined operating frequencies, this can reduce the SAR value of the first antenna 10.

When the signal sensing unit 50 generates and outputs a command signal to the signal comparison unit 70 due to any user-induced pressure, and the wireless communication device 200 works at the predetermined operating frequencies of GSM mode or WCDMA mode such as GSM 1900, CDMA2000, the baseband microchip 30 outputs a high voltage logic signal (1) to one of the inputs 82, the signal comparison unit 70 outputs a high voltage logic signal (1) to the other input 82. Thus, the output 84 of the OR gate 80 outputs a low switch signal (0) to control the switch unit 90 to connect the second antenna 20, forming a second transmission path, and the first antenna 10 receives the wireless signals and transmits the wireless signals to the baseband microchip 30. The baseband microchip 30 processes the wireless signals and transmits the processed wireless signal to the second antenna 20 through the switch unit 90 along the second transmission path. In such case, the wireless signals are transmitted by the second antenna 20, which can reduce the SAR value due to the structure and installation position of the second antenna 20.

Additionally, the antenna system 100 can also be employed in the wireless communication device 200 with WCDMA mode or TD-SCDMA mode. Moreover, the OR gate 60 can be omitted, therefore, the baseband microchip 30 is directly electrically connected to one of the inputs 82 to transmit wireless signals and high or low voltage logic signals.

In the antenna system 100 of this exemplary embodiment, the antenna system 100 can receive different kinds of wireless signals, so the wireless communication device 200 can work at different frequency bands, which can selectively minimize the SAR value of the wireless communication device 200. In addition, the signal sensing unit 50 and the signal comparison unit 70 can output different voltage logic signals (e.g., logical 1 or 0) to control the switch unit 90 to electrically connect the first antenna 10 or the second antenna 20, resulting in selectively transmitting wireless signals through different transmission paths.

In the present specification and claims the word "a" or "an" preceding an element does not exclude the presence of a plurality of such elements. Further, the word "comprising" does not exclude the presence of other elements or steps than those listed.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. An antenna system used in a wireless communication device, comprising:
   a first antenna that receives and transmits wireless signals;
   a second antenna that transmits wireless signals;
   a baseband microchip that electrically connects the first antenna to receive the wireless signals, the baseband microchip processing the wireless signals and providing a voltage logic signal;
   a signal sensing unit that detects user-induced pressure on the wireless communication device to generate a command signal;
   a logical circuit that electrically connects the baseband microchip and the signal sensing unit to respectively receive the voltage logic signal and the command signal; and
   a switch unit that electrically connects the logical circuit and the baseband microchip, wherein the logical circuit logically processes the voltage logic signal and the command signal to generate different switch signals, and the switch unit is controlled by the switch signals from the logical circuit to connect to the first antenna or to the second antenna to transmit the wireless signals;
   wherein if the signal sensing unit does not detect the user-induced pressure, and the wireless communication device works at frequencies of radio frequency (RF) signals, the logical circuit generates a first switch signal to control the switch unit to connect to the first antenna;
   if the signal sensing unit detects the user-induced pressure, and the wireless communication device works at a non-predetermined operating frequency of the RF signals, the logical circuit generates the first switch signal to control the switch unit to connect to the first antenna; and
   if the signal sensing unit detects the user-induced pressure, and the wireless communication device works at a predetermined operating frequency of the RF signals, the logical circuit generates a second switch signal to control the switch unit to connect to the second antenna.

2. The antenna system as claimed in claim 1, wherein the logical circuit comprises a signal comparison unit storing the predetermined operating frequency of the RF signals of the wireless communication device, the signal sensing unit provides and outputs a command signal to the signal comparison unit due to the user-induced pressure, the signal comparison unit is enabled by the command signal, and compares the current operating frequency with the predetermined operating frequency of the RF signals of the wireless communication device to generate an electrical signal.

3. The antenna system as claimed in claim 2, wherein when the current operating frequency is equal to the predetermined operating frequency of the RF signals, the signal comparison unit generates a high voltage logic signal, when the current operating frequency is unequal to the predetermined operating frequency of the RF signals, the signal comparison unit generates and outputs a low voltage logic signal.

4. The antenna system as claimed in claim 3, wherein the logical circuit further comprises a NAND gate, the NAND gate comprises two inputs and an output, the two inputs are respectively electrically connected to the signal comparison unit and the baseband microchip, and the output is electrically connected to the switch unit.

5. The antenna system as claimed in claim 4, wherein the inputs of the NAND gate receive electrical signals from both the baseband microchip and the signal comparison unit, and the output sends a corresponding switch signal to the switch unit.

6. The antenna system as claimed in claim 5, wherein the logical circuit further comprises an OR gate that implements logical disjunction, the OR gate is electrically connected to the baseband microchip and one of the inputs, and is capable of receiving voltage logic signals from the baseband microchip and implementing logic operation.

7. The antenna system as claimed in claim 1, wherein when the first antenna and the second antenna transmit wireless signals, the specific absorption rate (SAR) of the first antenna is greater than the SAR of the second antenna.

8. The antenna system as claimed in claim 1, wherein the signal sensing unit is a capacitive type transducer located at the position adjacent to the first antenna.

9. The antenna system as claimed in claim 1, wherein the baseband microchip is capable of decoding the wireless signals from the first antenna into corresponding audio signals, and further encoding the audio signals into corresponding wireless signals, and selectively transmitting the converted wireless signals to the first antenna or the second antenna through the switch unit.

10. An antenna system used in a wireless communication device, comprising:
a first antenna that receives and transmits wireless signals;
a second antenna that transmits wireless signals;
a baseband microchip that electrically connects the first antenna to receive the wireless signals, the baseband microchip processing the wireless signals and providing a voltage logic signal;
a signal sensing unit that detects user-induced pressure on the wireless communication device to generate a command signal;
a signal comparison unit that electrically connects to the signal sensing unit, the signal comparison unit activated by the command signal from the signal sensing unit to generate an electrical signal;
a NAND gate that electrically connects to the baseband microchip and the signal comparison unit; and
a switch unit that electrically connects the NAND gate and the baseband microchip, wherein the NAND gate receives the voltage logic signal from the baseband microchip and the electrical signal from the signal comparison unit and implements logic operation to generate different switch signals, and the switch unit is switched on by the switch signals to selectively connect the first antenna or the second antenna to from different transmission paths of the wireless signals;
wherein if the signal sensing unit does not detect the user-induced pressure, and the wireless communication device works at frequencies of radio frequency (RF) signals, the logical circuit generates a first switch signal to control the switch unit to connect to the first antenna;
if the signal sensing unit detects the user-induced pressure, and the wireless communication device works at a non-predetermined operating frequency of the RF signals, the logical circuit generates the first switch signal to control the switch unit to connect to the first antenna; and
if the signal sensing unit detects the user-induced pressure, and the wireless communication device works at a predetermined operating frequency of the RF signals, the logical circuit generates a second switch signal to control the switch unit to connect to the second antenna.

11. The antenna system as claimed in claim 10, wherein the signal comparison unit stores the predetermined operating frequency of the RF signals of the wireless communication device, the signal sensing unit provides and outputs a command signal to the signal comparison unit due to the user-induced pressure, the signal comparison unit is enabled by the command signal, and compares the current operating frequency with the predetermined operating frequency of the RF signals of the wireless communication device to generate an electrical signal.

12. The antenna system as claimed in claim 11, wherein when the current operating frequency is equal to the predetermined operating frequency of the RF signals, the signal comparison unit generates a high voltage logic signal, when the current operating frequency is unequal to the predetermined operating frequency of the RF signals, the signal comparison unit generates and outputs a low voltage logic signal.

13. The antenna system as claimed in claim 12, wherein the NAND gate comprises two inputs and an output, the two inputs are respectively electrically connected to the signal comparison unit and the baseband microchip, and the output is electrically connected to the switch unit.

14. The antenna system as claimed in claim 13, wherein the inputs of the NAND gate receive electrical signals from both the baseband microchip and the signal comparison unit, and the output sends a corresponding switch signal to the switch unit.

15. The antenna system as claimed in claim 10, wherein the signal sensing unit is a capacitive type transducer located at the position adjacent to the first antenna.

16. The antenna system as claimed in claim 10, wherein the baseband microchip is capable of decoding the wireless signals from the first antenna into corresponding audio signals, and further encoding the audio signals into corresponding wireless signals, and selectively transmitting the converted wireless signals to the first antenna or the second antenna through the switch unit.

17. A wireless communication device, comprising:
a main body; and
an antenna system that is positioned within the main body, comprising:
a first antenna that receives and transmits wireless signals;
a second antenna that transmits wireless signals;
a baseband microchip that electrically connects the first antenna to receive the wireless signals, the baseband microchip processing the wireless signals and providing a voltage logic signal;
a signal sensing unit that detects changes of parameter(s) of the wireless communication device to generate a command signal;

a logical circuit that electrically connects the baseband microchip and the signal sensing unit to respectively receive the voltage logic signal and the command signal; and a switch unit that electrically connects the logical circuit and the baseband microchip, wherein the logical circuit logically processes the voltage logic signal and the command signal and implement logic operation to generate different switch signals, and the switch unit is switched on by the switch signals to selectively connect the first antenna or the second antenna to from different transmission paths of the wireless signals;

wherein the logical circuit comprises a signal comparison unit and a NAND gate, the signal comparison unit pre-stores a predetermined operating frequency of the wireless communication device and compares the predetermined operating frequency with a current operating frequency of the wireless communication device; the NAND gate comprises two inputs and an output, the two inputs are respectively electrically connected to the signal comparison unit and the baseband microchip, and the output is electrically connected to the switch unit; and wherein when the baseband microchip outputs a high voltage logic signal to the NAND gate, the signal comparison unit outputs a low voltage logic signal to the NAND gate, the OR gate outputs a high switch signal to control the switch unit connect the first antenna to form a first transmission path to transmit GSM signals or WCDMA signals; when the baseband microchip outputs a high voltage logic signal to the NAND gate, the signal comparison unit outputs a high voltage logic signal to the NAND gate, the OR gate outputs a low switch signal to control the switch unit connect the second antenna to form a second transmission path to transmit GSM signals or WCDMA signals.

18. The wireless communication device as claimed in claim 17, wherein when the current operating frequency is equal to the predetermined operating frequency, the signal comparison unit generates a high voltage logic signal, when the current operating frequency is unequal to the predetermined operating frequency, the signal comparison unit generates and outputs a low voltage logic signal.

* * * * *